United States Patent [19]

Imamura

[11] 4,253,514

[45] Mar. 3, 1981

[54] LIGHT ALLOY SPLIT WHEEL RIM

[75] Inventor: Kazuo Imamura, Kaga, Japan

[73] Assignee: Daido Kogyo Co., Ltd., Ishikawa, Japan

[21] Appl. No.: 72,845

[22] Filed: Sep. 6, 1979

[30] Foreign Application Priority Data

Sep. 26, 1978 [JP] Japan ................... 53-132369[U]

[51] Int. Cl.³ .................. B60B 25/00; B60B 25/22
[52] U.S. Cl. .................. 152/405; 152/404; 152/379.3; 301/63 D; 301/97
[58] Field of Search .................. 301/95–98, 301/63 D, 6 V, 63 PW, 63 DS, 64 R, 67, 73, 79; 152/404, 405, DIG. 10, 381.1, 381.2, 379.1, 379.2, 379.5, 379.3, 381.3, 381.4; 29/159.1

[56] References Cited

U.S. PATENT DOCUMENTS

| | | | |
|---|---|---|---|
| 2,028,536 | 1/1936 | Eksergian | 29/159.1 |
| 2,405,954 | 8/1946 | Hollerith | 152/404 X |
| 2,905,223 | 9/1959 | Quayle | 152/404 |
| 4,102,379 | 7/1978 | Hamiya | 152/404 X |

FOREIGN PATENT DOCUMENTS

| | | | |
|---|---|---|---|
| 962318 | 4/1957 | Fed. Rep. of Germany | 301/97 |
| 53-44418 | 5/1978 | Japan | 29/159.1 |

*Primary Examiner*—Charles A. Marmor
*Attorney, Agent, or Firm*—Wenderoth, Lind & Ponack

[57] ABSTRACT

A light alloy divided wheel rim comprises a pair of substantially symmetrical rim members fastened together in face-to-face relationship by fastening devices. Each rim member integrally includes an outer flange, an intermediate bead and an inner flange. The rim members further include reinforcing devices. An O-ring is positioned between the facing inner flanges. A device is provided for protecting the O-ring against excess fastening force applied by the fastening devices.

8 Claims, 3 Drawing Figures

LIGHT ALLOY SPLIT WHEEL RIM

BACKGROUND OF THE INVENTION

This invention generally relates to a wheel rim for use in connection with a tubeless tire in a two-wheeled vehicle and more particularly, to a light alloy divided wheel rim for use in a two-wheeled vehicle in which the rim is connected to the wheel hub by means of plate spokes so as to reinforce the wheel and reduce the weight of the wheel.

Generally, in a divided wheel rim for a tubeless tire in a two-wheeled vehicle, the two rim members of the split wheel rim tend to separate from each other and are subjected to a bending force of moment produced by a radial force acting on the beads and flanges of the rim members when the tire with which the wheel rim is associated receives an impact while the vehicle is running. Furthermore, the prior art light alloy wheel rim is so rigid that the air pressure in the tubeless tire is prevented from leaking through the interfaces between the opposite inner surfaces of the flanges of the rim members when the rim members separate from each other. Thus, when the wheel rim is formed of light alloy, since the strength of light alloy is lower than that of steel, the light alloy wheel rim is required to have a thickness and weight substantially greater than those of steel divided wheel rims, and as a result the light alloy wheel rim is more expensive than the prior art wheel rims.

SUMMARY OF THE INVENTION

Therefore, an object of the present invention is to provide a novel and improved light alloy wheel rim which can effectively eliminate the disadvantages inherent in the prior art divided wheel rims.

Another object of the present invention is to provide a light alloy divided wheel rim of a tubeless tire in a two-wheeled vehicle which has a weight substantially equal to that of a comparative prior art light alloy wheel rim comprising a unitary rim member and yet is constructed to have a sufficient strength equal to that of the prior art comparative inseparable light alloy wheel rim.

The above and other objects and attendant advantages of the present invention will be more readily apparent to those skilled in the art from a reading of the following detailed description in conjunction with the accompanying drawings which show preferred embodiments of the invention for the purpose of illustration only, but not for limiting the scope of the same in any way.

DETAILED DESCRIPTION OF THE PREFERRED EMBODIMENTS OF THE INVENTION

Figure 1:
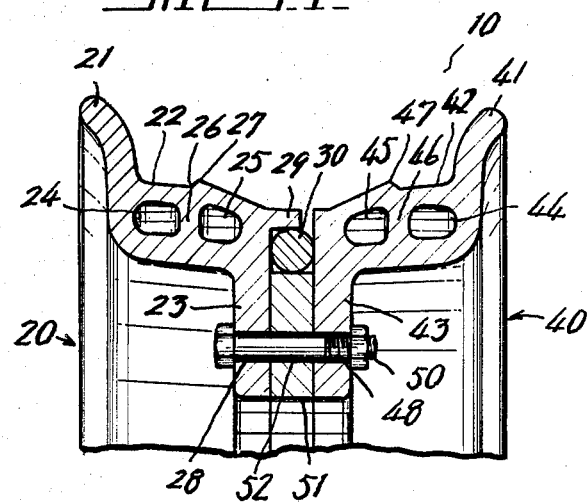
FIG. 1 is a fragmentary vertical sectional view of a first embodiment of a light alloy divided wheel rim for a tubeless tire in a two-wheeled vehicle incorporating the features of the present invention.

The present invention will be now described referring to the accompanying drawings and more particularly to FIG. 1 thereof in which the first embodiment of a light alloy divided wheel rim constructed in accordance with the present invention is shown. The light alloy divided wheel rim is generally shown by reference numeral 10 and generally comprises a pair of opposite substantially symmetrical rim members 20 and 40. The rim member 20 integrally includes an outer flange 21 extending radially and outwardly at the outer side edge, a substantially hollow intermediate bead 22 and an inner flange 23 extending radially and inwardly at the inner side edge. The hollow bead 22 is provided with two discrete cavities 24 and 25 separated from each other by means of a vertical partition 26. The bead 22 is further provided on the outer surface thereof with a hump or projection 27 which serves to prevent the associated tire from inadvertently displacing even when air leaks from between the opposite side edges of the tire and the outer flanges, for example. The inner flange 23 is provided with a plurality of angularly spaced bolt or spoke mounting holes 28 (which will sometimes be referred to merely as "holes" hereinafter) and also a projection 29 extending inwardly from the flange at the outer edge thereof for controlling the fastening force applied to an O-ring 30 held between the inner flanges of the two rim members 20 and 40 and also for holding the ring in position.

Similarly, the rim member 40 integrally includes an outer flange 41 extending radially and outwardly at the outer side edge, a substantially hollow intermediate bead 42 and an inner flange 43 extending radially and inwardly at the inner side edge. The hollow bead 42 is provided with two discrete cavities 44 and 45 separated from each other by means of a vertical partition 46. The bead 42 is provided on the outer surface thereof with a hump or projection 47 the function of which is the same as that of the hump 27 on the rim member 20. The inner flange 43 is provided with a plurality of angularly spaced bolt or spoke mounting holes 48 which are adapted to be aligned with the holes 28 in the inner flange 23 of the rim member 20 when the two rim members are fastened together. A bolt and nut type fastening means 50 extends through the associated aligned bolt holes 28 and 48 in the inner flanges 23 and 43 to fasten the rim members 20 and 40 together to thereby apply a fastening force to the O-ring 30. In order that the O-ring 30 will not be subjected by any excessive fastening force by the fastening means 50 when the rim members are fastened together, an annular spacer 51 having a hole 52, the diameter of which is greater than that of the fastening means 50 and through which fastening means 50 extends, is provided between the inner flanges 23 and 43 of the rim members 20 and 40 so as to control the distance between the rim members. If the O-ring has applied thereto an excessive fastening force by the fastening means 50, there is the possibility that the ring is deformed or crushed, thus leading to air leakage.

With the two rim members 20 and 40 and O-rings 30 held in their assembled position by the fastening means 50, when a tire (not shown) is mounted on the beads 22 and 42 of the rim members 20 and 40 and plate spokes (not shown) are connected to the thus formed rim 10, one wheel of the two-wheeled vehicle is provided.

In the light alloy wheel rim 10 with the above mentioned construction and arrangement of parts, since the beads 22 and 42 of the two rim members 20 and 40 have a substantially hollow construction by the provision of the cavities 24, 25 and 44, 45 therein, respectively, the beads 22 and 42 are increased in their strength and reduced in their weight. Furthermore, since the partition is present between the two cavities in each of the beads, when the rim member blank in a bar form provided by extrusion molding the material for the rim member is bent into a ring shape in the production of the rim member, the partition effectively prevents the areas of the bead where the cavities are present from being crushed under the bending force. And since the projection 29 and spacer 51 cooperate with each other in preventing the O-ring 30 from being subjected to any excessive fastening force which may lead to the crushing of the O-ring 30 when the two rim members are fastened together by the fastening means 50, the rim members 20 and 40 can be firmly maintained in their assembled condition whereby air leakage which may occur due to the deformation or crushing of the O-ring will be prevented.

Figure 2:
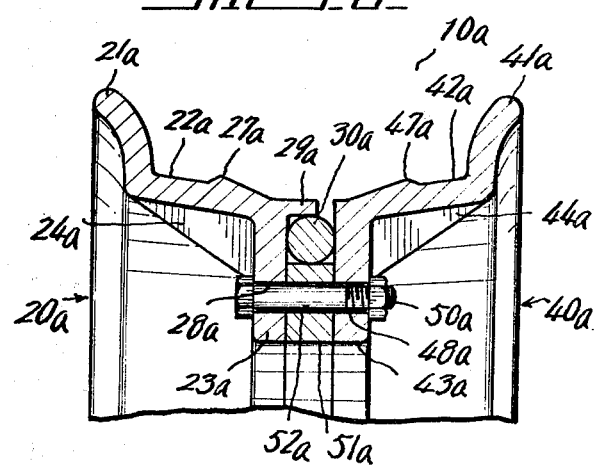
FIG. 2 is a fragmentary vertical sectional view of a second embodiment of a light alloy divided wheel rim for a tubeless tire in a two-wheeled vehicle incorporating the features of the present invention.
Figure 3:
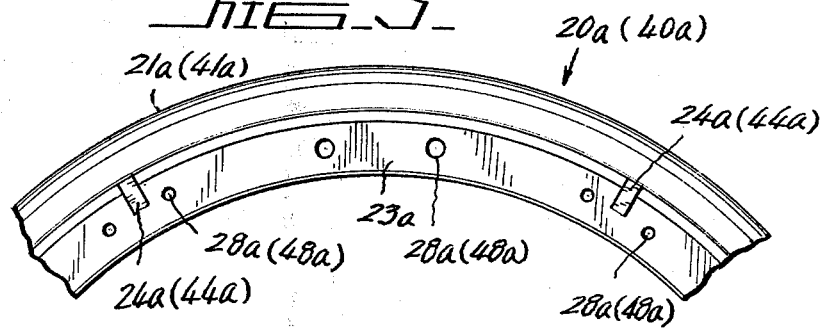
FIG. 3 is a front elevational view of a portion of one rim member forming the light alloy divided wheel rim as shown in FIG. 2.

Now reference will be made to FIGS. 2 and 3 in which the second embodiment of light alloy divided wheel rim constructed in accordance with the present invention is shown.

As in the case of the first embodiment described hereinabove, the second embodiment of divided wheel rim 10a generally comprises a pair of opposite substantially symmetrical rim members 20a and 40a. The rim member 20a integrally includes an outer flange 21a extending radially and outwardly at the outer side edge, an intermediate solid bead 22a and an inner flange 23a extending radially and inwardly at the inner side edge. The bead 22a is provided on the outer surface thereof with a hump or projection 27a and the inner flange 23a is provided with a plurality of angularly spaced bolt or spoke mounting holes 28a and a projection 29a extending inwardly at the outer edge of the inner flange. In the second embodiment of the present invention, a plurality of angularly spaced ribs 24a are provided throughout the periphery of the rim member 20a extending from the inner edge of the outer flange 21a through the inner surface of the bead 22a to a portion of the outer surface of the inner flange 23a adjacent to and short of the bolt holes 28a.

The other rim member 40a also integrally includes an outer flange 41a extending radially and outwardly at the outer side edge, an intermediate solid bead 42a having a hump or projection 47a on the outer surface thereof and an inner flange 43a extending radially and inwardly at the inner side edge and having a plurality of angularly spaced bolt of spoke mounting holes 48a which are adapted to align with the corresponding bolt holes 28a in the inner flange 23a of the rim member 23a when the two rim members 20a and 40a are fastened together by the bolts 50a.

Also in the second embodiment, an annular spacer 51a is provided between the inner flanges 23a and 43a of the rim members 20a and 40a and the projection 29a and has a plurality of angularly spaced holes 52a which are adapted to align with the bolt holes 28a and 48a in the inner flanges 23a and 43a when the two rim members 20a and 40a are fastened together. As in the case of the first embodiment, the projection 29a and spacer 51a cooperate with each other to properly position O-ring 30a which is provided extending circumferentially in the interface defined by the facing inner flanges 23a, 43a and the projection 29a in the same manner as the corresponding parts in the first embodiment, and also to protect the O-ring against any excessive fastening force when the two rim members 20a, 40a are fastened together by the fastening means 50a. Furthermore, the spacer 51a serves to maintain the tire in its proper width when the rim members are fastened together by means of the fastening means 50a. The rim member 40a is also provided with a plurality of reinforcing ribs 44a in the same manner as the corresponding ribs on the rim member 20a and the ribs 44a function in the same manner as the ribs 24a. The ribs 24a or 44a are formed integrally with the other parts of the rim member 20a or 40a by swaging an endless rim blank while rotating or the blank by a rocking die while rotating, for example (the forming method of the ribs is shown and described in Japanese Patent Application Laid-Open Publication No. 11064/1979). The ribs 24a and 44a can be provided in a great number as desired provided that the presence of the ribs do not interfere with the connection of plate spokes (not shown) to the rims to thereby prevent the entire rim from deforming.

The bolt holes 28a, 48a can be provided in the respectively associated inner flanges 23a, 43a in positions near the respectively associated reinforcing ribs as much as possible, provided that the presence of the bolt holes in such positions does not interfere with the heads of the fastening means 50, 50a or tools for manipulating the fastening means whereby the inner flanges 23a, 43a can be prevented from deforming when the rim members are fastened together.

As is clear from the foregoing description in connection with the second embodiment of the present invention, since the reinforcing ribs 24a or 44a are provided on the rim 20a or 40a extending from the inner edge of the outer flange 21a or 41a through the inner surface of the bead 22a or 42a to a portion of the outer surface of the inner flange 23a or 43a, the rim has a sufficient strength reinforced with the ribs and thus, the bead can be formed integrally with the rest of the rim without increasing the thickness of the bead by a substantial amount whereby the weight of the rim can be reduced. Furthermore, with the provision of the reinforcing ribs, the fastening position of the inner flanges can be set nearer to the outer diameter of the rim than in the prior art wheel rims and the bending force to moment from the bead can be reduced. The rim member of the second embodiment of a light alloy divided wheel rim can be formed from a cylindrical blank or by rolling a flat blank into a cylindrical body and then welding the opposite side edges of the cylindrical body. Since the rim member is formed by die swaging while rotating rather than by rolling, the finished rim member has a uniform configuration, and particularly the inner surface of the thus processed rim member is smooth and free of any slip flaw or flaws which will otherwise develop in the finished inner surface of the rim member when processed by rolling. Although the construction of the rim member becomes complicated because of the formation of the ribs 24a or 44a, the finished rim member does not require any grinding such as buffing which would often locally reduce the thickness of the rim member.

Although the best mode contemplated for carrying out the present invention has been herein shown and described, it will be apparent that modification and variation may be made without departing from what is regarded to be the subject matter of the invention.

What is claimed is:

1. A light alloy divided wheel rim for use in connection with a tubeless tire in a two-wheeled vehicle and which is adapted to be connected to a wheel hub by means of plate spokes, said rim comprising:

a pair of substantially similar rim members fastened together in face-to-face relationship;

each said rim member including an intermediate bead, an outer flange integral with and extending radially outwardly from the outer side edge of said bead, and an inner flange integral with and extending radially inwardly from the inner side edge of said bead;

each said outer flange being a solid member;

each said bead including means for reinforcing the respective said rim member, said reinforcing means comprising a plurality of discrete cavities formed entirely within said bead, said cavities being separated from each other by an integral annular partition within said bead and extending substantially vertically of the axis of said rim member;

said rim members being assembled with said inner flanges facing each other;

bolt means extending through said inner flanges for fastening said rim members together;

annular seal means positioned between said inner flanges for forming a seal between said rim members when said rim members are fastened together; and means for protecting said seal means from excessive fastening force applied by said bolt means.

2. A rim as claimed in claim 1, wherein each said bead has integrally formed on the outer surface thereof an annular projection for preventing a tire from being displaced from the rim.

3. A rim as claimed in claim 1, wherein said protecting means comprises an annular projection extending axially inwardly from a first said rim member and adapted to abut a second said rim member when excessive tightening force is applied by said bolt means, and an annular spacer positioned between said inner flanges, said seal means being positioned between an inner peripheral surface of said projection and an outer peripheral surface of said spacer.

4. A rim as claimed in claim 3, wherein said inner flanges and said spacer have aligned hole means for connection to plate spokes for use in mounting the rim to a wheel hub.

5. A light alloy divided wheel rim for use in connection with a tubeless tire in a two-wheeled vehicle and which is adapted to be connected to a wheel hub by means of plate spokes, said rim comprising:

a pair of substantially similar rim members fastened together in face-to-face relationship;

each said rim member including an intermediate bead, an outer flange integral with and extending radially outwardly from the outer side edge of said bead, and an inner flange integral with and extending radially inwardly from the inner side edge of said bead;

said rim members being assembled with said inner flanges facing each other;

bolt means extending through said inner flanges for fastening said rim members together;

annular seal means positioned between said inner flanges for forming a seal between said rim members when said rim members are fastened together;

means for protecting said seal means from excessive fastening force applied by said bolt means;

each said rim member including respective reinforcing means comprising a plurality of circumferentially spaced ribs, each said rib extending from the radially inner edge of said outer flange, through and along the radially inner surface of said bead, and to a portion of the axially outer surface of said inner flange adjacent to but radially outwardly of said bolt means; and each said rim member and the respective said ribs thereof comprising an integral swaged element resulting from an operation of swaging an endless rim blank while rotating.

6. A rim as claimed in claim 5, wherein each said bead has integrally formed on the outer surface thereof an annular projection for preventing a tire from being displaced from the rim.

7. A rim as claimed in claim 5, wherein said protecting means comprises an annular projection extending axially inwardly from a first said rim member and adapted to abut a second said rim member when excessive tightening force is applied by said bolt means, and an annular spacer positioned between said inner flanges, said seal means being positioned between an inner peripheral surface of said projection and an outer peripheral surface of said spacer.

8. A rim as claimed in claim 7, wherein said inner flanges and said spacer have aligned hole means for connection to plate spokes for use in mounting the rim to a wheel hub.

* * * * *